United States Patent
Cuthbertson

(10) Patent No.: US 7,138,060 B2
(45) Date of Patent: Nov. 21, 2006

(54) IN SITU REMEDIATION OF CONTAMINATED GROUNDWATER

(75) Inventor: James Floyd Cuthbertson, Howell, MI (US)

(73) Assignee: Delta Environmental Consultants, Inc., Shoreview, MN (US)

( * ) Notice: Subject to any disclaimer, the term of this patent is extended or adjusted under 35 U.S.C. 154(b) by 0 days.

(21) Appl. No.: 11/095,137

(22) Filed: Mar. 30, 2005

(65) Prior Publication Data

US 2006/0219631 A1    Oct. 5, 2006

(51) Int. Cl.
   *C02F 3/00*    (2006.01)
(52) U.S. Cl. .................. 210/610; 210/611; 210/170
(58) Field of Classification Search .............. 210/610, 210/611, 170
   See application file for complete search history.

(56) References Cited

U.S. PATENT DOCUMENTS

| | | | |
|---|---|---|---|
| 5,525,008 A | 6/1996 | Wilson | |
| 5,759,402 A | 6/1998 | Hirano et al. | |
| 5,833,855 A * | 11/1998 | Saunders | 210/611 |
| 6,276,871 B1 | 8/2001 | Bruso | |
| 6,336,772 B1 | 1/2002 | Yamashita | |
| 6,457,905 B1 | 10/2002 | Nickell | |
| 6,474,908 B1 | 11/2002 | Hoag et al. | |
| 6,497,534 B1 | 12/2002 | McCoy | |
| 6,502,633 B1 | 1/2003 | Cooper et al. | |
| 6,805,518 B1 | 10/2004 | Bruso | |
| 6,830,695 B1 | 12/2004 | Brady et al. | |

OTHER PUBLICATIONS

Anderson, R. et al., "Anaerobic Bioremediation of Benzene under Sulfate-Reducing Conditions in a Petroleum-Contaminated Aquifer," *Environ. Sci. Technol.*, vol. 34, No. 11, pp. 2261-2266 (2000).
Bradley, P. et al., "Effect of Redox Conditions on MTBE Biodegradation in Surface Water Sediments," *Environ. Sci. Technol.*, vol. 35, No. 23, pp. 4643-4647 (2001).
Coaters, J. et al., "Oxidation of Polycyclic Aromatic Hydrocarbons under Sulfate Reducing Conditions," *Applied and Environmental Microbiology*, vol. 62, No. 3, pp. 1099-1101 (Mar. 1996).
Cunningham, J. et al., "Enhanced in Situ Bioremediation of BTEX-Contaminated Groundwater by Combined Injection of Nitrate and Sulfate," *Environ. Sci. Technol.*, vol. 35, No. 8, pp. 1663-1670 (2001).
Franzmann, P. et al., "The role of microbial populations in the containment of aromatic hydrocarbons in the subsurface," *Biodegradation*, vol. 13, pp. 65-78 (2002).
Kleikemper, J. et al., "Activity and Diversity of Sulfate-Reducing Bacteria in a Petroleum Hydrocarbon-Contaminated Aquifer," *Applied and Environmental Microbiology*, vol. 68, No. 4, pp. 1516-1523 (Apr. 2002).

(Continued)

*Primary Examiner*—Chester T Barry
(74) *Attorney, Agent, or Firm*—Merchant & Gould P.C.

(57) ABSTRACT

In situ treatment of contaminated groundwater includes identifying a site contaminated with a pollutant susceptible to degradation by in situ, sulfate-reducing microorganisms. An amount of sulfate needed to support metabolization of the contaminants is estimated. The estimated amount of sulfate is applied to the site. In various alternatives of embodiments of the invention, the sulfate may be applied is a dry state or as a solution with water. The sulfate concentration in solution is in excess of 1000 ppm and may be as high as a near-saturation concentration.

20 Claims, 5 Drawing Sheets

OTHER PUBLICATIONS

Lovley, D. et al., "Benzene Oxidation Coupled to Sulfate Reduction," *Applied and Environmental Microbiology*, vol. 61, No. 3, pp. 953-958 (Mar. 1995).

McGuire, J. et al., "Evaluating Behavior of Oxygen, Nitrate, and Sulfate during Recharge and Quantifying Reduction Rates in a Contaminated Aquifer," *Environ. Sci. Technol.*, vol. 36, No. 12, pp. 2693-2700 (2002).

Newsletter, *Soil & Groundwater Technology*, vol. 3, Issue 2, 1 page (Jul. 2003).

Reinhard, M. et al., "In Situ BTEX Biotransformation under Enhanced Nitrate- and Sulfate-Reducing Conditions," *Environ. Sci. Technol.*, vol. 31, No. 1, pp. 28-36 (1997).

Schroth, M. et al., "In situ assessment of microbial sulfate reduction in a petroleum-contaminated aquifer using push-pull tests and stable sulfur isotope analyses," *Journal of Contaminant Hydrology*, vol. 51, pp. 179-195 (2001).

Ulrich, G. et al., "Enhanced Anaerobic Benzene/Hydrocarbon Biodegradation via Sulfate Amendment for Aquifer Remediation at a Refinery," Surbec-ART Environmental, LLC, Norman, Oklahoma, 1 page, date unknown.

Weiner, J. et al., "Enhanced Anaerobic Benzene Degradation with the Addition of Sulfate," *CRC Press LLC*, pp. 159-173 (Copyright 1998).

Weiner, J. et al., "Anaerobic Benzene Degradation in Petroleum-Contaminated Aquifer Sediments after Inoculation with a Benzene-Oxidizing Enrichment," *Applied and Environmental Microbiology*, vol. 64, No. 2, pp. 775-778 (Feb. 1998).

\* cited by examiner

IN SITU REMEDIATION OF CONTAMINATED GROUNDWATER

I. BACKGROUND OF THE INVENTION

1. Field of the Invention

This invention pertains to a method of in situ remediation of contaminated groundwater. More particularly, this invention pertains to a method of in situ remediation of contaminated groundwater by stimulating the bio-degradation of contaminants by sulfate-reducing microorganisms.

2. Description of the Prior Art

The severity and extent of groundwater contamination are well known environmental challenges. One source of such contamination is hydrocarbon contamination of groundwater from petroleum-based spills or leakages. For example, underground storage tanks, above ground storage tanks, pipelines and the like may leak petroleum-based contaminants into the soil and associated groundwater. Similarly, surface spills of such contaminants can migrate into groundwater.

There are many suggested methods and techniques for treating contaminated soil or groundwater. Examples of these are found in U.S. Pat. Nos. 6,830,695; 6,805,518; 6,502,633; 6,497,534; 6,474,908; 6,457,905; 6,336,772; 6,276,871; 5,833,855; 5,759,402 and 5,525,008.

Recently, much attention has focused on in situ remediation by anaerobic (oxygen-lean or oxygen-free) bioremediation of contaminants by sulfate-reducing microorganisms. Such microorganisms are described in U.S. Pat. No. 5,833,855.

Only recently has scientific literature reported on exploiting in situ sulfate-reducing microorganisms to treat hydrocarbon-contaminated groundwater. For example, Anderson et al., "Anaerobic Bioremediation of Benzene under Sulfate-Reducing Conditions in a Petroleum-Contaminated Aquifer", *Environmental Science and Technology*, Vol. 34, No. 11, pages 2261–2266 (2000) purports to be the first field study demonstrating stimulation of anaerobic benzene degradation in a petroleum-contaminated aquifer. That study suggests the addition of sulfate stimulated the activity of benzene-degrading, sulfate-reducing microorganisms.

One study suggests there may be only a few petroleum-related compounds that anaerobic microbial communities cannot degrade. The study states the capacity for self-purification of hydrocarbon-contaminated sediments may be greater than previously recognized. Coates, et al., "Oxidation of Polycyclic Aromatic Hydrocarbons under Sulfate-Reducing Conditions", *Applied and Environmental Microbiology*, Vol. 62, No. 3, pages 1099–1191 (1996). In 2001, microbial mineralization of MTBE (methyl tert-butyl ether) was first reported under sulfate-reducing conditions. Bradley et al., "Effect of Redox Conditions on MTBE Biodegradation in Surface Water Sediments", *Environmental Science and Technology*, Vol. 35, No. 23, pages 4643–4647 (2001).

While the application of sulfate to contaminated groundwater is promising and has received considerable scientific consideration, Applicant has concluded the effective use of this technology has been burdened by erroneous assumptions limiting the effective use of sulfate application to contaminated groundwater. Specifically, the environmental industry, scientific community and relevant government authorities have accepted as dogma that sulfate solutions as applied to contaminated sites should be limited to a sulfate concentration of not more than 250 parts per million (ppm).

The applied concentration limitation limits the efficacy and cost efficiency of this treatment. This limitation requires an enormous amount of solution be prepared and applied in order to treat a contaminated site. The enormity of the required solution drastically impacts the economic feasibility of sulfate application for in situ bioremediation of contaminated groundwater, and the technical feasibility of applying the solution into the subsurface through the use of wells. The enormous amounts of solution must be prepared, transported, and applied over a long period of time. Each of these processes significantly adds to the cost of in situ remediation.

Applicant has concluded that the recognized application concentration limits are unnecessary constraints on the effective application of sulfate to contaminated groundwater sites.

A summary for the basis of the concentration limitation can be found in the scientific literature. See, e.g., Cunningham, et al. "Enhanced In Situ Bioremediation of BTEX-Contaminated Groundwater by Combined Injection of Nitrate and Sulfate", *Environmental Science and Technology*, Vol. 35, No. 8, pages 1663–1670 (2001). The Cunningham, et al., paper explains the rationale for the 250 ppm sulfate concentration limitation as well as describing techniques for applying sulfate solutions to contaminated groundwater through wells and techniques for monitoring the effects of a treatment.

The Cunningham, et al., paper is measuring BTEX concentrations in contaminated groundwater. BTEX is an acronym for gasoline constituents (i.e., benzene, toluene, ethylbenzene and xylene) found as contaminants in groundwater.

Table 1 of the Cunningham, et al., paper (p. 1664) notes that sulfate ($SO_4^{2-}$) is applied in an aqueous solution having a sulfate concentration not in excess of 250 ppm. Two reasons are given for the concentration limitation. First, the authors cite scientific literature that toluene degradation is inhibited if sulfide is produced. Second, the authors cite the United States government's secondary drinking water standard for maximum tolerable sulfate concentration for drinking water at 250 ppm. While water is not toxic at this concentration, the taste of the water can be adversely affected.

These factors have affected the environmental industry to limit sulfate applications to use sulfate solutions applied at a concentration of 250 ppm. Further, these constraints have been adopted by regulatory bodies within the United States.

The application of these constraints have significantly and adversely affected the beneficial effects of sulfate treatment programs. In order to be effective, an enormous volume of sulfate solution must be applied. Such solution can be applied directly on the surface of the contaminated site, through preexisting or specially drilled wells or in percolating tubes laid out in a grid or other pattern in trenches excavated at the site.

When a large volume of sulfate solution is required, the cost of preparing, transporting, and applying the sulfate solution can be prohibitive. Such a large volume of solution requires a very long application period. A rapid application of such a large volume of solution can result in surface runoff or it can flush contaminants out of the plume and simply cause the contaminants to migrate to another location without degrading the contaminants.

Applicant believes the scientific rationale for the constraints of 250 ppm is flawed notwithstanding the respected credentials of the advocates of such constraints. For example, even though the United States government and the various state regulatory bodies have adopted the 250 ppm standard to avoid unpleasant taste in drinking water, such standards are believed by Applicant to ignore that the sulfates do in fact break down in nature and the beneficial action of the sulfate-reducing microorganisms in contaminated soils and groundwater prevent the migration of sulfates into drinking water.

Further, it is Applicant's belief that, notwithstanding the concerns expressed in Cunningham, et al., supra, excess sulfide production and inhibition of toluene degradation do not occur in situ. Excess sulfide production has occurred in laboratory conditions but not significantly in situ where dissolved iron is present in the groundwater. In the absence of such dissolved iron, the sulfide combines with hydrogen to form hydrogen sulfide, which has an obnoxious odor. But with dissolved iron in the groundwater (as is typical), the sulfide combines with the dissolved iron as a harmless precipitate.

It is an object of the present invention to provide a method for treating contaminated groundwater with sulfates in a manner uninhibited by the doctrines and dogma of the prior art.

II. SUMMARY OF THE INVENTION

According to a preferred embodiment of the present invention, a method is provided for in situ treatment of contaminated groundwater. The groundwater may be contaminated by any pollutant susceptible to degradation by sulfate-reducing bacteria. The method includes identifying a site contaminated with such a pollutant and where the site has, in situ, sulfate-reducing microorganisms known to degrade such contaminants in anaerobic conditions. An amount of contaminated water within a contaminant plume is calculated or estimated. Further, an amount of sulfate needed to support metabolization of the contaminants is estimated. The estimated amount of sulfate is applied to the site. In various alternatives of embodiments of the invention, the sulfate may be applied in a dry state or as a solution with water. The sulfate concentration in solution is in excess of 250 ppm and may be as high as a near-saturation concentration.

III. BRIEF DESCRIPTION OF THE DRAWING

IV. DETAILED DESCRIPTION OF THE PREFERRED EMBODIMENT

A. High Concentration Sulfate Application

Figure 1:
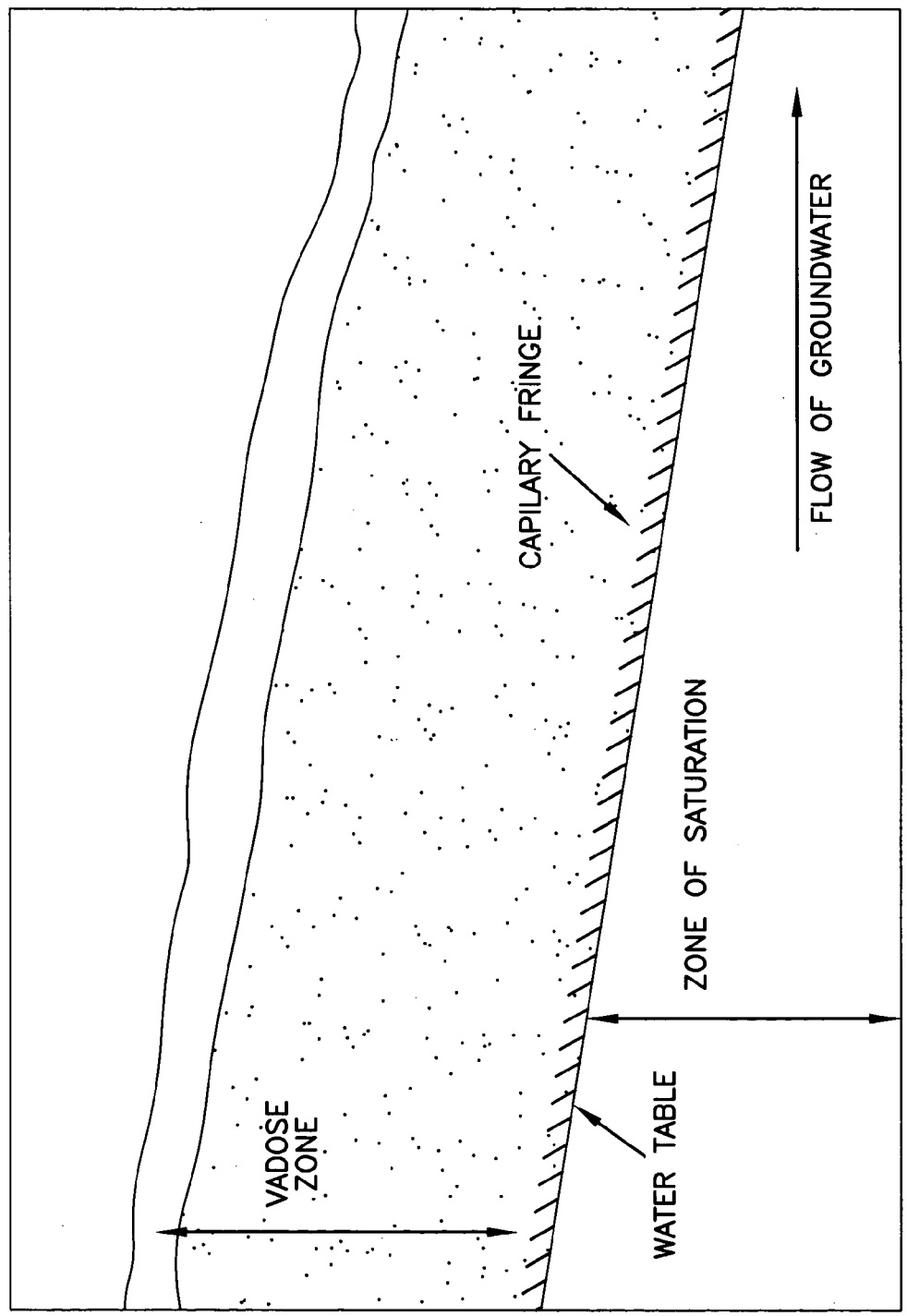
FIG. 1 is a schematic illustration of sub-surface geology and showing a capillary fringe.

Applicant has determined that the conventional yet current, scientific dogma regarding in situ bio-remediation of contaminated groundwater is incorrect. Specifically, Applicant has determined that limiting sulfate concentration to less than 250 ppm at the time of application is unnecessary for environmental safety in most cases. Further, Applicant has found that substantially higher application concentration rates (e.g., at or near saturation levels of about 250,000 ppm to 350,000 ppm) yield positively surprising results in the treatment of contaminated sites as well as greatly enhancing the cost effectiveness of sulfate treatment of contaminated sites.

For the purpose of this application, a contaminant is meant to include any groundwater contaminant, which is susceptible to degradation by sulfate-reducing bacteria. In a more preferred embodiment, such contaminants include hydrocarbon contaminants and in a most preferred embodiment, such contaminants include petroleum-based contaminants such as aromatic fuel hydrocarbons such as benzene, toluene, ethylbenzene and xylene (collectively, "BTEX"). Also, as used herein, sulfate ($SO_4^{-2}$) is delivered as Epsom salts ($MgSO_4$). It will be appreciated that the sulfate can be supplied in a different form.

As previously described, the prior art recognized that sulfate application to a contaminated site could promote degradation of hydrocarbons by sulfate-reducing microorganisms. However, the prior art was hindered by adherence to dogma limiting the concentration of applied sulfate solutions to be no greater than 250 ppm (parts sulfate to parts water). This limitation was founded, in part, upon United States government standards that the sulfate concentration in drinking water should be no greater than 250 ppm. This was extrapolated to require that sulfates should be applied to groundwater at applied concentrations no greater than the 250 ppm to prevent a rise in groundwater sulfate concentrations.

The prior art was also restricted by that belief that sulfate application to groundwater would, as a result of the sulfate-reducing microorganisms, release free sulfide ions. The free sulfide ions could combine with hydrogen to form the offensive gas hydrogen sulfide (commonly associated with the offensive smell of rotten eggs). Also, the prior art reports that sulfide would inhibit the degradation of the contaminant toluene.

Applicant has concluded the foregoing constraints are misplaced. Applicant contends (and has found) the application of sulfate at concentrations in excess of 250 ppm will not result in an intolerable increase in drinking water sulfate concentrations. Also, free sulfide ions arise in laboratory environments but not significantly in situ where the sulfide can readily combine with iron to form a precipitate of iron sulfide.

Accordingly, Applicant has found that the rate and concentration of sulfate application can be greatly increased (e.g., concentration increases of up to three orders of magnitude). These increases have the benefits of greatly improving the economics of applying sulfate to contaminated soils and groundwater and greatly increasing the efficacy of a sulfate remediation process.

B. Estimating Amount of Sulfate to be Applied

Where the prior art focused on the rate of sulfate delivery (i.e., keeping the application solution at a concentration of less than 250 ppm), the Applicant greatly increases the rate at which sulfate is applied by calculating the amount of sulfate needed to promote the metabolization of the in situ contaminants. This amount of sulfate is then applied at the fastest rate practical.

In anaerobic conditions, sulfate-reducing bacteria reduce the sulfate to provide a source of oxygen to be used in metabolizing the hydrocarbon contaminants. Applicant applies the sulfate at the highest concentration possible for the particular site. This promotes bacterial action to metabolize the hydrocarbon contaminants. The intent of the procedure is for metabolization to continue until complete consumption of the contaminants.

In the method of the invention, Applicant first selects a site with a contaminated plume containing contaminants susceptible to degradation by sulfate-reducing microorganisms. Such contaminants include BTEX contaminants as well as other hydrocarbons. The presence of sulfate-reducing microorganisms is determined by noting if sulfate in the plume is depleted. If the sulfate in the plume is depleted, the presence of sulfate-reducing bacteria is assumed.

Applicant estimates the amount of sulfate needed to support anaerobic metabolization of the contaminants by the in situ microorganisms. The sulfate is then applied to the contaminated plume at a rate selected to ensure that the sulfate will enter the plume and be available to assist the metabolization of the contaminants by sulfate-reducing microorganisms.

By way of example, the amount of sulfate to be applied can be performed in a sequential operation by first calculating the size of the aquifer impacted by the contaminants. After the dimensions of the plume are estimated, the porosity of the plume is estimated. The assumed porosity multiplied times the volume of the aquifer yields an estimate of the volume of impacted groundwater.

Once an estimate of the impacted groundwater is made, the amount of sulfate to be applied to the aquifer can be calculated so that the total concentration of sulfate to be remaining in the aquifer will not exceed 250 ppm after remediation is complete. While sulfate concentration at observation wells near application sites may exceed 250 ppm for limited periods, the plume-diluted concentration after remediation will be less than 250 ppm. Certain sites, which due to remote location or unusual features, may permit post-treatment sulfate concentrations in excess of 250 ppm without threat to drinking water contamination.

By way of example, if a contaminated plume at a contaminated site is assumed to have dimensions of 80 feet by 40 feet by 10 feet with a soil porosity of 30%, the foregoing estimates can be made as follows:

1. the size of the impacted aquifer is approximately 32,000 ft$^3$ (80×40×10);
2. the plume contains an estimated 9600 ft$^3$ of contaminated groundwater (i.e., the equivalent of 71,800 gallons or 595,940 pounds of contaminated groundwater)
3. the estimated amount of sulfate to be applied to the plume is 149 pounds (595,940 lbs of contaminated groundwater times 250 pounds sulfate divided by 1,000,000 pounds groundwater=149 pounds sulfate to be applied to the plume).

It will be appreciated that the forgoing is only an estimate. The precise amount to be applied to the site can be modulated in response to site-specific parameters. For example, if there is an extremely high concentration of contaminants in the aquifer, the amount of sulfate can be greatly increased. Further, adjustments to the amount of sulfate can be made based upon the hydrogeological conditions or the proximity of sensitive receptors, such as drinking water wells.

As noted, the sulfide from the process combines with dissolved iron. If desired, the site can be checked in advance to see if the naturally occurring dissolved iron concentration is too low to combine with the sulfide to be produced by the process. If too low, iron can be added in any process to create dissolved iron in the groundwater.

C. Applying Sulfate to Contaminated Plume

Once the specific amount of sulfate to be applied has been calculated, the sulfate is applied with a method selected to ensure application of the sulfate to the plume. For example, if the aquifer is very close to the surface (for example within one to two feet of the surface) and there is no hard cover (for example paved surfaces such as a parking lot) on the surface, then the sulfate can be applied in dry form directly onto the surface of the site over the plume. It will be appreciated that applying sulfate to the site includes applying sulfate within a close proximity of the plume including within 100 feet hydraulically up-gradient from the plume.

For deeper aquifers (or for contaminated sites where the plume is covered by paved surfaces, buildings or the like), the sulfate can be applied to the plume through one or more wells installed into the plume from the surface. These can be pre-existing wells or specially formed wells. It will be appreciated that identifying and selecting wells for treatment of groundwater are well known within the art. Examples of such are disclosed in Cunningham et al., article, supra. Other methods for applying sulfate solution to an aquifer include excavating trenches within the site and placing permeable or perforated conduits within the trenches. The sulfate solution is applied by pumping it into the conduits for percolated distribution to the site.

It is not always possible to treat an entire site. For example, the contaminated plume may reside beneath an extremely large building such as a factory or the like. Under such circumstances, the plume is treated over a long period of time by applying the treatment described above to only a portion of the plume. Over time, the remainder of the contaminated groundwater will flow to the previously treated portion which can then be subsequently treated. This process can continue over long periods of time to treat the entire plume.

D. Specific Examples of Practicing Present Invention

The present invention permits extremely rapid delivery of the entire contents of the sulfate to a contaminated a plume. For example in the prior art (which limits application at a concentration of 250 ppm), a representative example of such an application is described in Anderson et al., "Anaerobic Bioremediation of Benzene under Sulfate-Reducing Conditions in a Petroleum-Contaminated Aquifer", *Environmental Science and Technology*, Vol. 34, No. 11, pages 2261–2266 (2000). In that application, approximately 5 gallons of low concentration solution (about 768 ppm) were applied per well, per day over a very extended period of time (about 90 days—or 450 gallons of solution). With the present invention operating at a concentration of 250,000 ppm, the same amount of sulfate (applied at the same amount of liquid application rate) can be applied as less than 2 gallons of solution applied within one hour. The benefits of the present invention have achieved positively surprising results.

FIGS. 2–7 illustrate actual test results of the present invention. FIG. 1 illustrates a sub-surface geology to assist in explaining certain terms. The smear zone is the interval over which the capillary fringe fluctuates and is a location in the aquifer, which can trap a significant portion of the originally released contaminant and can act as a long-term source of contaminant leaching to the groundwater.

Figure 2:
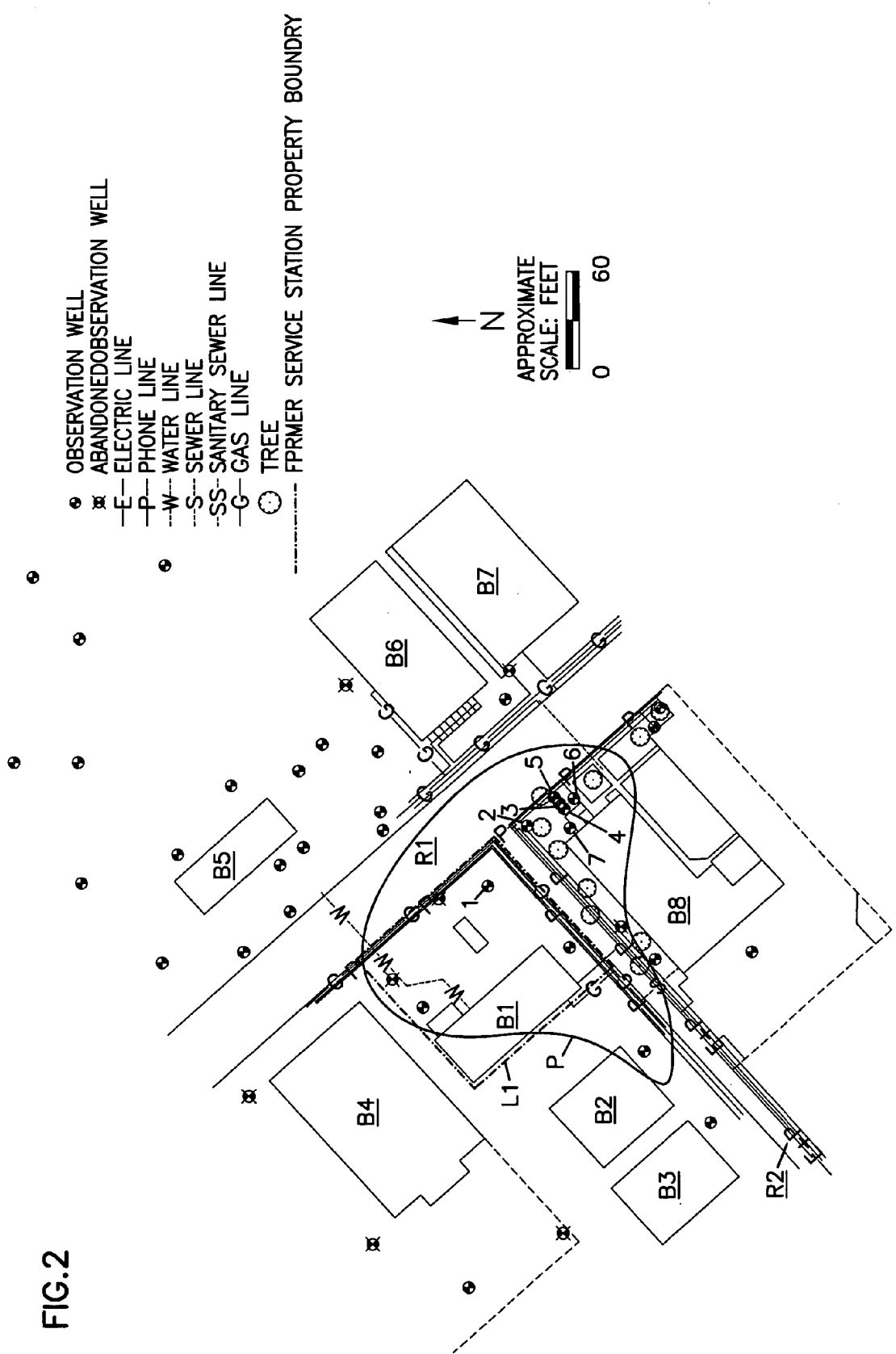
FIG. 2 is a top plan view of a site showing application wells and observation wells.
Figure 3:
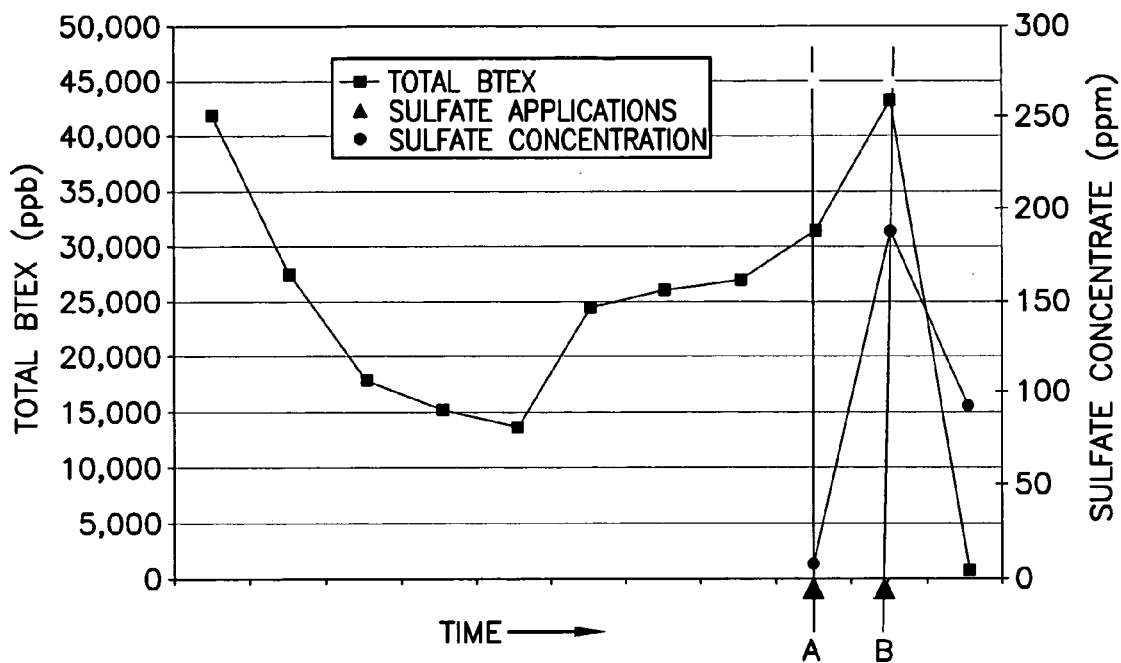
FIG. 3 is a graphical representation of actual results from applying the present invention in a test condition with the results of FIG. 3 taken at a first observation well.
Figure 4:
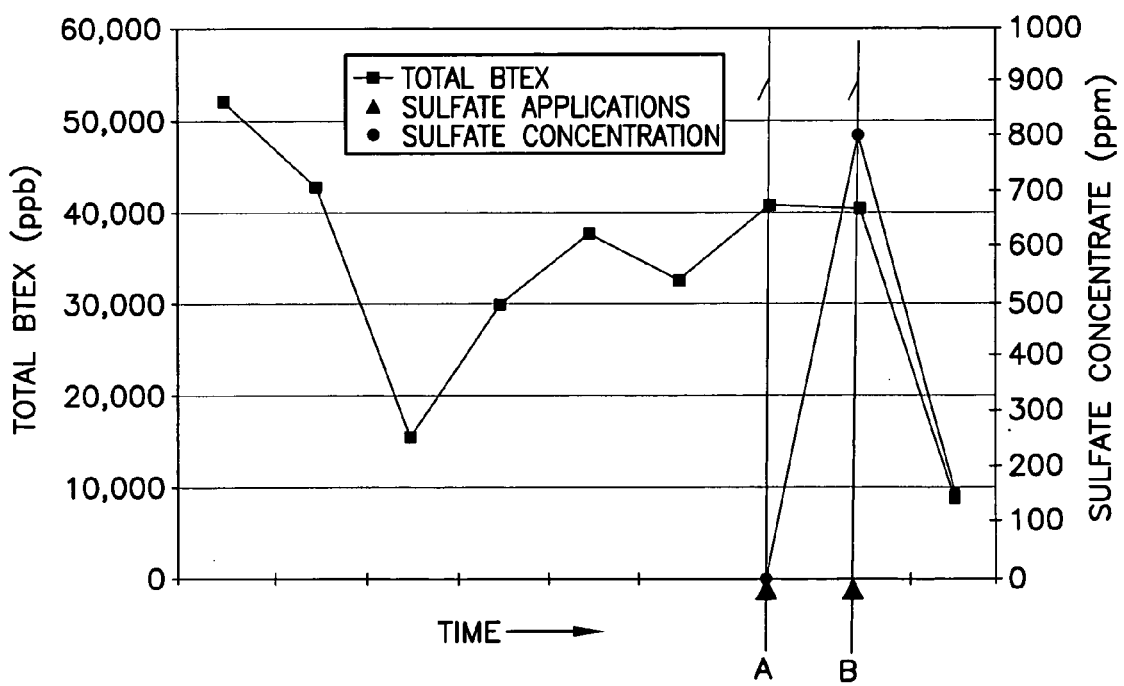
FIG. 4 is a graphical representation similar to FIG. 4 showing results at a second observation well.
Figure 5:
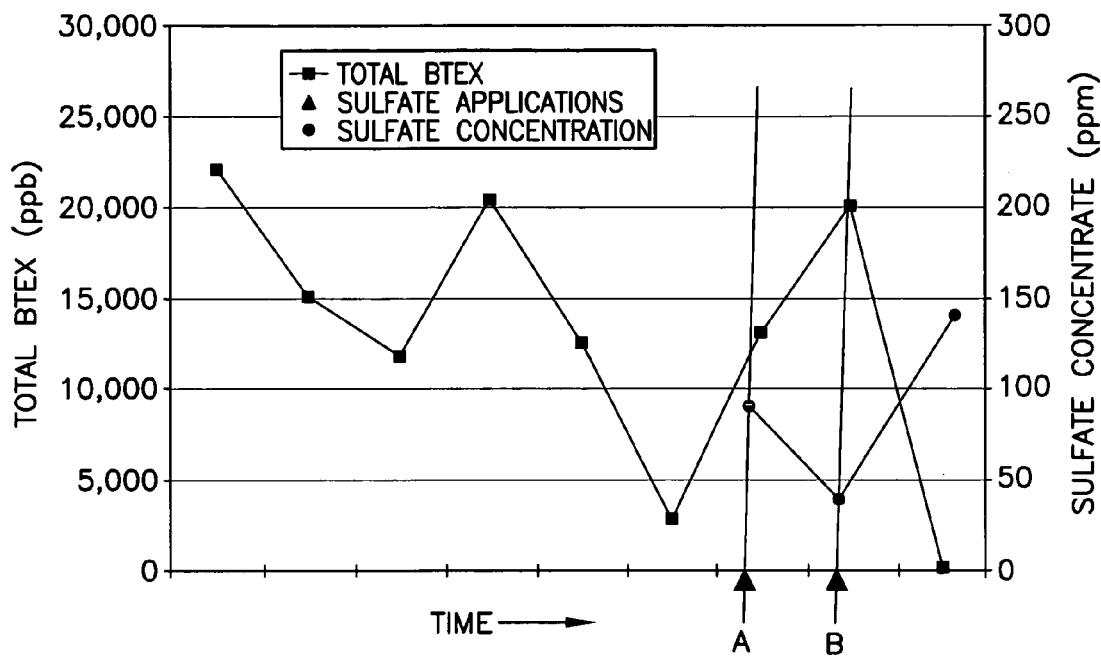
FIG. 5 is a graphical representation similar to FIG. 5 showing results at a third observation well.
Figure 6:
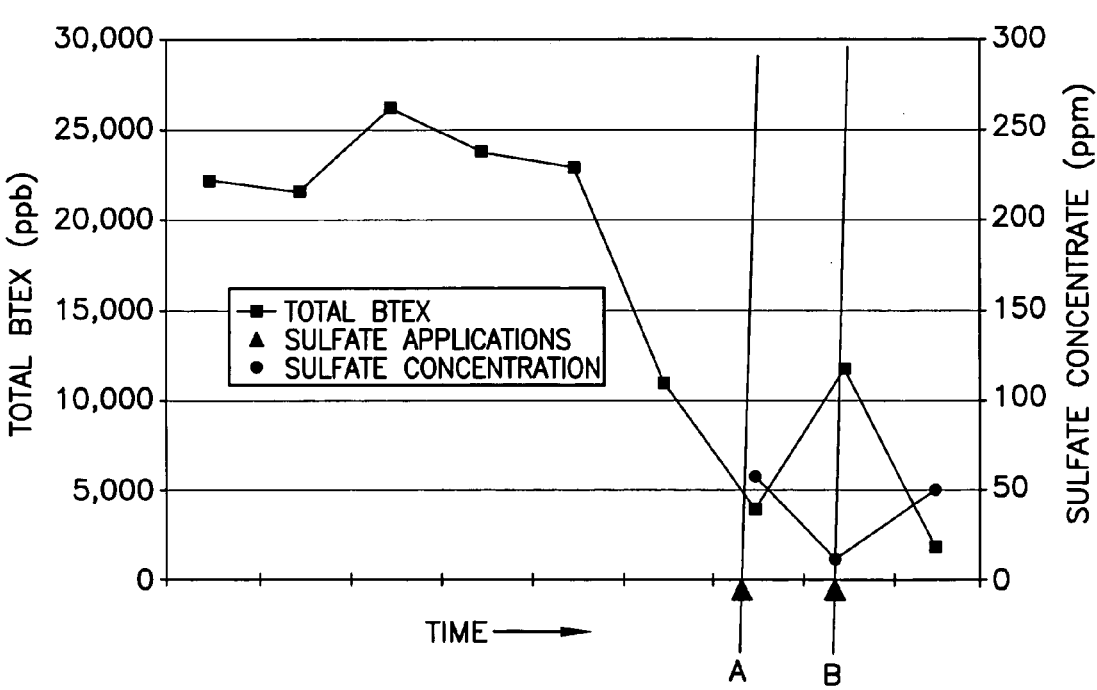
FIG. 6 is a graphical representation similar to FIG. 6 showing results at a fourth observation well.
Figure 7:
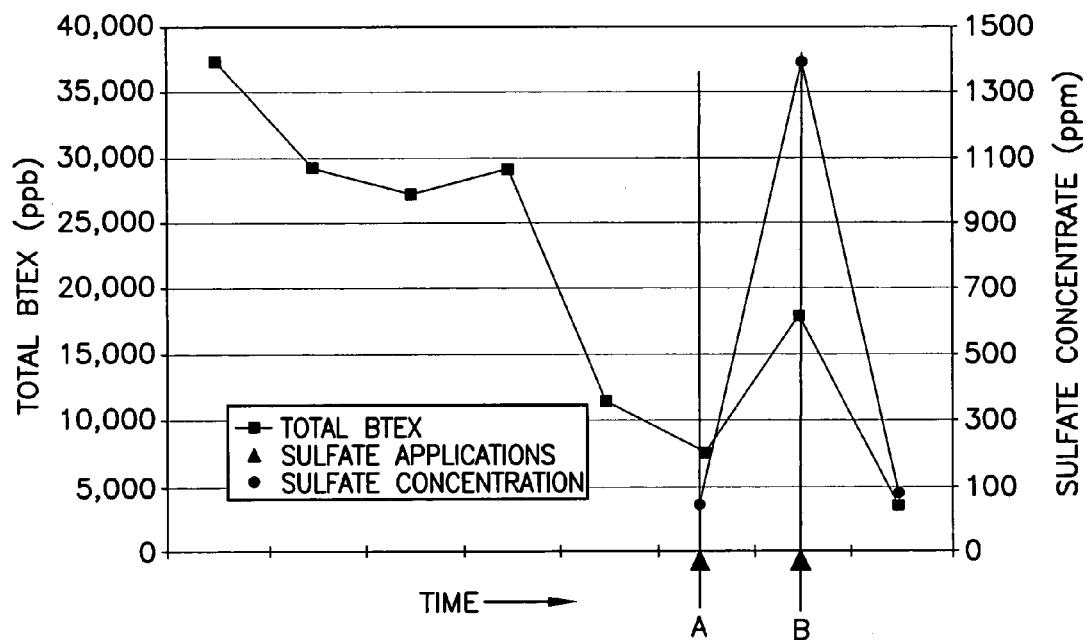
FIG. 7 is a graphical representation similar to FIG. 7 showing results at a fifth observation well.

FIG. 2 shows an application and observation well layout for a contaminated site. The legend of FIG. 2 is self-explanatory. In addition, several elements are noted. Buildings on or near the contaminated site are labeled B1–B8. Paved streets are labeled R1 and R2. The lot line of the former service station property which was the source of the ground water contamination is labeled L1. The boundary of the contaminated plume is labeled "P".

FIGS. 3–7 are graphical representations of actual results from applying the present invention in a test condition. In the test of FIGS. 2–7, a specific contaminated site was identified being associated with gasoline pollutants leaking from an underground gasoline storage tank system. It will be appreciated that this type of contamination is very common.

The data presented in FIGS. 3–7 was taken from five different observation wells (labeled, 3, 4, 5, 6 and 7, respectively, in FIG. 2) for collecting such data. These wells were selected for sampling because these were the nearest wells that characterized the portion of the contaminant plume that was targeted for remediation hydraulically down-gradient from the application wells (wells 1 and 2 in FIG. 2). These nearest wells were selected for sampling because they were deemed to be the most representative for monitoring the effectiveness of the remediation technology. Particularly, building B2 (FIG. 2) has an occupied basement raising concerns about the potential for petroleum vapors to enter the building from the contaminated plume. Since application of sulfates (as will be described), the concentrations of contaminants have been greatly reduced and the associated concern with potential vapor infiltration has been minimized.

The collected data includes BTEX concentrations shown in the left vertical axis and presented as parts per billion (ppb) of contaminant in water. The right vertical access represents measured sulfate concentrations as reported in parts per million (ppm). The horizontal axis represents passage of time. The time between data points varies between about 2 to 4 months. In FIGS. 3–7, data was collected at intermediate time periods. These data points are connected by straight-line segments. This is for convenience of graphical presentation and not intended to suggest a true linear relation between data sets.

The contaminated site of FIGS. 2–7 was identified as a contaminated site in the early 1990's and has been subjected to numerous efforts to attempt to treat the site since that time. Notwithstanding those efforts, the site contaminant concentrations continue to fluctuate over time with very high levels of BTEX concentrations.

It will be noted that at time point A, a treatment was made according to the present invention by applying a solution of sulfate to the site. The solution is admitted to both of existing wells 1 and 2 in FIG. 2 at an applied sulfate concentration of approximately 250,000 ppm. At some of the observation wells (e.g., as illustrated in FIGS. 3, 5, 6 and 7), the BTEX concentration continued to rise for approximately four months after such application. Such a rise is common but the reasons for such are not fully known.

A second application is applied at time point B at both of wells 1 and 2 in FIG. 2. It will be noted there is a rapid decline of measured contaminants at all wells. Furthermore, even though the sulfate is applied at a concentration of approximately 250,000 ppm, only at the wells of FIGS. 4 and 7 does the sulfate concentration from the observation well exceed 200 ppm. This indicates that the sulfates were rapidly utilized by the sulfate reducing bacteria. At all wells, the sulfate concentration drops to well below the 250 ppm concentrations at the end of the study. Also, Applicant tests indicate sulfide concentrations remain low.

The results demonstrated in the forgoing figure are extraordinary. For approximately 15 years, this highly contaminated site was unsuccessfully remediated. With the present application, and the invention taught herein, the site was effectively treated over a period of about 6 months. The amount of time to actually apply the sulfate on the particular events A and B was about 3.75 and 2.5 hours, respectively. After the application, the site was effectively treated by the degradation action of the sulfate-reducing bacteria over a period of 4 months.

The forgoing clearly demonstrates that Applicant has successfully demonstrated that the prior art dogmas are not correct and provided a new treatment modality for taking advantage of sulfate-reducing microorganisms present in contaminated groundwater plumes. The present invention permits the application of sulfates in excess of the conventional 250 ppm and as high as saturation levels or in solid application of sulfates calculated to support the full metabolization of contaminants in a contaminated plume by microorganisms.

E. Treatment of Removed Soil

In the foregoing example, the preferred embodiment was described in treating contaminated groundwater in situ in an aquifer. Contaminating hydrocarbons may reside in soil in the vadose zone. In such cases the soil can be removed and treated.

The soil can be delivered to a treatment location and deposited on any non-permeable layer. The estimate of contaminants in the site can be calculated and, from this, the estimate of the amount of sulfate to support metabolization of the contaminants can be made. A high concentration sulfate solution as described is added to the soil and left in residence to complete the metabolization. The soil can then be drained of the solution and returned to the treatment site.

It having been taught how the present invention can be attained in the preferred embodiment, modifications and equivalents of the disclosed concepts will readily occur to one of ordinary skill in the art. It is intended that such modifications and equivalents be included within the scope of the claims, which are appended hereto.

I claim:

1. A method for treating contaminated groundwater in situ, said method comprising:
   a. identifying a site contaminated with hydrocarbon contaminants;
   b. estimating an amount of water contained within a contaminated plume of said site;
   c. calculating an amount of sulfate that can be diluted by said estimated amount to remain below a fully-diluted sulfate contamination limit;
   d. preparing a solution of water and an amount of sulfate less than said calculated amount and wherein a resulting concentration of sulfate in the solution is in excess of 1000 ppm; and
   e. applying said prepared solution in a manner selected for said prepared solution to enter said contaminated plume.

2. A method according to claim 1 wherein said estimating of step (b) includes:
   a. calculating a potential volume of said contaminated plume; and
   b. multiplying said potential volume by an assumed porosity of said plume.

3. A method according to claim 1 wherein said calculating of step (c) includes:
   a. identifying a maximum target amount of sulfate concentration for said plume; and
   b. multiplying said estimated amount of water by said target amount.

4. A method according to claim 1 wherein said preparing of step (d) includes mixing said amount of sulfate with an amount of water selected to form a near-saturated mixture.

5. A method according to claim 1 wherein said applying of step (e) includes a topical application of said prepared solution to said site overlying said plume.

6. A method according to claim 1 wherein said applying of step (e) includes an underground application of said prepared solution to said site overlying said plume.

7. A method according to claim 6 wherein said underground application includes forming a well from a surface of said site into said plume and applying said prepared solution to said well.

8. A method according to claim 6 wherein said underground application includes burying a permeable distribution conduit within said site and applying said prepared solution to said conduit.

9. A method according to claim 1 wherein said applying of step (e) includes applying said solution to said site within 100 feet hydraulically up-gradient of an edge of said plume.

10. A method according to claim 1 wherein said identifying of step (a) includes identifying said site as having, in situ, sulfate-reducing microorganisms known to degrade hydrocarbon contaminants in anaerobic conditions.

11. A method for treating contaminated groundwater in situ, said method comprising:
   a. identifying a site contaminated with hydrocarbon contaminants and having, in situ, sulfate-reducing microorganisms known to degrade hydrocarbon contaminants in anaerobic conditions;
   b. preparing a solution of water and sulfate with a sulfate concentration in excess of defined pollutant limits of sulfate contamination for water and wherein a resulting concentration of sulfate in the solution is in excess of 1000 ppm; and
   c. applying said prepared solution in a manner selected for said prepared solution to enter said contaminated plume.

12. A method according to claim 11 wherein said preparing of step (b) includes mixing said amount of sulfate with an amount of water selected to form a near-saturated mixture.

13. A method according to claim 11 wherein said preparing of step (b) includes first:
   a. estimating an amount of water contained within a contaminated plume of said site;
   b. calculating an amount of sulfate that be diluted by said estimated amount to remain below a sulfate contamination limit; and
   c. said preparing includes preparing a solution of water and an amount of sulfate less than said calculated amount.

14. A method according to claim 11 wherein said estimating of step (b) includes.
   a. calculating a potential volume of said contaminated plume; and
   b. multiplying said potential volume by an assumed porosity of said plume.

15. A method according to claim 13 wherein said calculating of step (c) includes:
   a. identifying a maximum target amount of sulfate concentration for said plume; and
   b. multiplying said estimated amount of water by said target amount.

16. A method according to claim 11 wherein said applying of step (c) includes a topical application of said prepared solution to said site overlying said plume.

17. A method according to claim 11 wherein said applying of step (c) includes an underground application of said prepared solution to said site overlying said plume.

18. A method according to claim 17 wherein said underground application includes forming a well from a surface of said site into said plume and applying said prepared solution to said well.

19. A method according to claim 17 wherein said underground application includes burying a permeable distribution conduit within said site and applying said prepared solution to said conduit.

20. A method according to claim 11 wherein said applying of step (c) includes applying said solution to said site within 100 feet hydraulically up-gradient of an edge of said plume.

* * * * *